E. A. HALBLEIB.
LOCK WASHER.
APPLICATION FILED JULY 31, 1918.
1,427,807.
Patented Sept. 5, 1922.
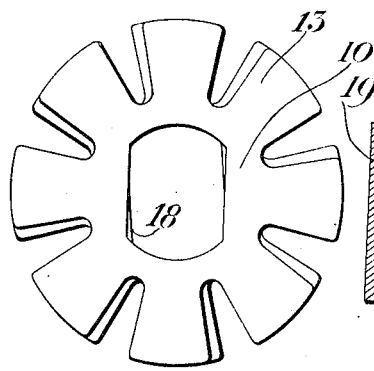
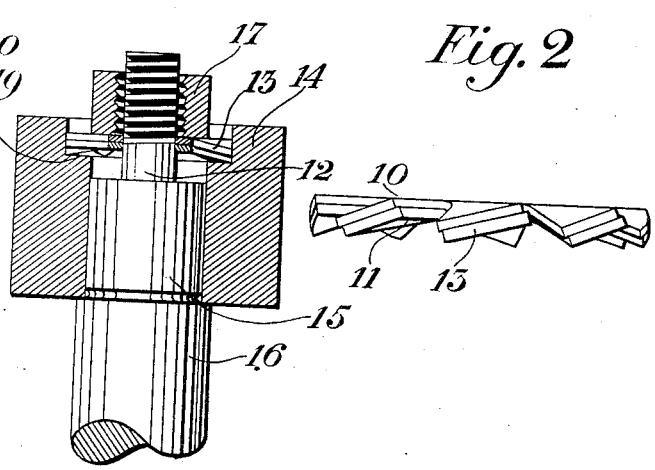
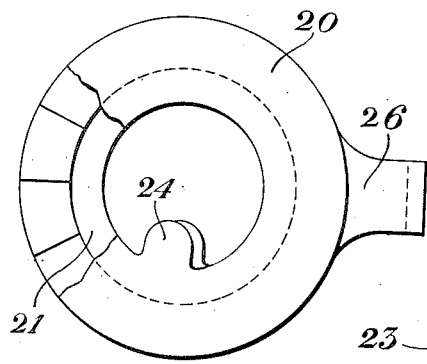
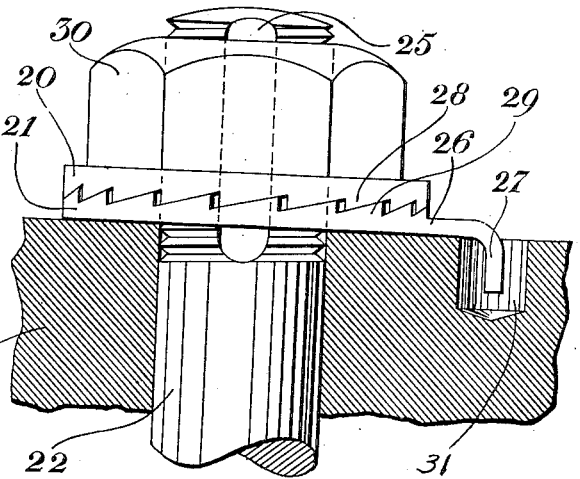
Inventor:
Edward A. Halbleib
by his attorney
Farnum F. Dorsey Patented Sept. 5, 1922.

1,427,807

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

LOCK WASHER.

Application filed July 31, 1918. Serial No. 247,610.

*To all whom it may concern:*

Be it known that I, EDWARD A. HALBLEIB, a citizen of the United States, residing at Rochester, in the county of Monroe and State of New York, have invented certain new and useful Improvements in Lock Washers; and I do hereby declare the following to be a full, clear, and exact description of the invention, such as will enable others skilled in the art to which it appertains to make and use the same.

Lock-washers or collars are sometimes used to prevent relative rotation of a shaft or stud and a member such as a cam, carried by the shaft, or a body in which the stud is fixed, particularly where relative rotational adjustability of the parts is necessary. The present invention relates to lock-washers or collars for this purpose.

The object of the invention is to produce lock-washers or collars which will automatically take up lost motion between themselves and the shaft or stud secured thereby, so that when the washers are compressed by a nut or otherwise there can be no relative rotation in either direction.

The foregoing object is attained by using the washers or collars in pairs, and providing them with cooperative peripheral inclines which act, first, to promote a relative rotation of the two washers whereby lost motion is taken up between the shaft or stud and the two washers in opposite directions, respectively, and then to prevent retrograde relative rotation of the washers when they are subjected to axial compression by a nut or otherwise.

The invention resides, further, in certain details of form and structure which will be set forth in connection with the following description of the illustrated embodiments of the invention.

In the accompanying drawings Fig. 1 is a plan-view of a pair of lock-washers embodying the present invention in a form adapted particularly for manufacture from sheet-metal, and Fig. 2 is a side-elevation of the same. Fig. 3 is a vertical sectional view showing the washers of Fig. 1 in use to secure a cam adjustably on a shaft. Fig. 4 is a plan-view of a pair of lock-washers or collars embodying the invention in a modified form, and Fig. 5 is a side-elevation, partly in section, showing the same in use to secure a stud in a stationary member or support.

In Figs. 1, 2 and 3 the invention is shown as embodied in a pair of washers 10 and 11 which are exactly similar. Each washer is generally circular in form, and is punched from sheet-steel or other suitable material. By means of radial slots each washer is divided peripherally into a series of arms 13, and these arms are bent or twisted into an angular relation to the general plane of the washer, so as to present a series of peripheral inclines. The washer, as a whole, is also slightly dished, the middle part being higher than the outer ends of the arms.

The washers just described are shown as used to lock a cam 14 adjustably to a shaft 15 upon which it is mounted. The shaft has a threaded extension 12, and this extension is flattened so as to conform to the central openings in the washers, which are shaped as shown in Fig. 1. The cam rests on a shoulder 16 on the shaft, and it is provided, at the top, with a circular recess in which the washers fit closely, as shown in Fig. 3, the ends of the arms 13 engaging a horizontal shoulder 19 which defines the bottom of the recess.

A nut 17 is screwed on the extension 12 and bears against the upper washer. When this nut is screwed home the axial pressure between the washers, transmitted through the inclined surfaces of the arms and aided by the friction of the nut, causes a slight relative rotation of the washers, whereby the straight sides 18 of the openings in the washers are moved angularly out of alignment, as shown in Fig. 1. This movement is arrested only when all lost motion between the washers and the shaft has been taken up. When the nut has been finally tightened the inclined surfaces prevent retrograde relative movement of the washers, and thus the washers act as a unit, locked positively against rotation in either direction on the shaft.

The washers are locked frictionally to the cam. The pressure of the nut flattens the washers, thus causing peripheral expansion by which the ends of the arms are thrust forcibly against the walls of the recess in the cam, and thus the cam is secured adjustably in any angular position in which it may be set on the shaft. This feature is not new in itself, but the radially slotted form of the washers, through which it is secured, is particularly adapted for the convenient and inexpensive embodiment of the peculiar features of the present invention.

In the modified form of the invention shown in Figs. 4 and 5 the washers or collars 20 and 21 are used to lock a stud 22 against rotation in a stationary body or support 23. Here the washers have inclined teeth 28 and 29 on the peripheral portions of their opposed faces, and in place of the flattened openings of Fig. 1 they have, as the substantial equivalent, generally circular openings, and key-like projections 24 which cooperate with a slot or key-way 25 in the stud. The lower washer 21 has an arm 26 with a depending extremity 27 which engages a hole 31 in the support 23 and thus prevents rotation of the washer 21. If adjustability be desired the hole 31 may be one of a circular series in which the extremity 27 may be placed selectively. When the nut 30 is tightened relative rotation of the parts causes the key-projections 24 to bind against the opposite sides of the key-way, thus taking up all lost motion between the washers and the stud.

The invention is not limited to the embodiments thereof hereinbefore described and illustrated in the accompanying drawings, but it may be embodied in various other forms within the scope of the following claims.

The invention claimed is:

1. Lock-washers, formed for non-rotative engagement with a stud or the like and with a relatively stationary member, characterized by the fact that they are provided with peripheral inclines adapted to cooperate, when the washers are used in pairs, so as to promote relative rotation of the washers in one direction, and to prevent opposite rotation when the washers are compressed by a nut or the like.

2. Lock-washers, as in claim 1, formed of sheet-metal of uniform thickness, with the inclined portions in the form of tongues separated by substantially radial slots.

3. Lock-washers, as in claim 2, in which the tongues have a longitudinal downward inclination, so that the washers may be expanded in effective diameter, when flattened by axial pressure, to secure a frictional engagement of their peripheries with the relatively stationary member.

4. The combination, with a relatively stationary member and with a stud mounted therein and provided with a non-circular portion, of a nut threaded upon the stud, and means engaging the non-circular portion of the stud and anchored to the stationary member, said means being constructed and adapted, when subjected to pressure from the nut, to clamp the stud, at its non-circular portion, positively against rotation in either direction.

EDWARD A. HALBLEIB.